United States Patent [19]

Galloway et al.

[11] Patent Number: 5,573,306
[45] Date of Patent: Nov. 12, 1996

[54] NON-SLIP SEAT BELT COVER

[76] Inventors: Evan M. Galloway; K. Maria Davis, both of 112 Sunridge Park, Gulfport, Miss. 39507

[21] Appl. No.: 452,958

[22] Filed: May 30, 1995

[51] Int. Cl.⁶ .................................................. B60R 22/14
[52] U.S. Cl. ................................ 297/482; 24/23 W
[58] Field of Search ..................... 297/482; 24/23 W, 24/20 W, 713, 714.6, 634, 642

[56] References Cited

U.S. PATENT DOCUMENTS

| | | | |
|---|---|---|---|
| D. 320,110 | 9/1991 | Hawkins | D2/639 |
| D. 331,835 | 12/1992 | Welch | D2/639 |
| D. 332,864 | 2/1993 | Hansen | D2/639 |
| D. 343,284 | 1/1994 | Jaramillo | D2/639 |
| 2,699,550 | 1/1955 | Freid | 297/482 X |
| 2,855,602 | 10/1958 | Gerowin | 297/482 X |
| 3,050,734 | 8/1962 | Dopyera | 297/482 X |
| 3,491,410 | 1/1970 | Elfgen | 24/23 W |
| 3,736,627 | 6/1973 | Sosinski | 24/23 W |
| 3,957,282 | 5/1976 | Finnigan | 297/482 |
| 4,619,468 | 10/1986 | Spill | 297/482 X |
| 4,678,205 | 7/1987 | Wold | 297/482 X |
| 4,699,401 | 10/1987 | Saenz | 297/482 X |
| 4,741,574 | 5/1988 | Weightman et al. | 297/482 |
| 4,887,318 | 12/1989 | Weinreb | 297/482 X |

FOREIGN PATENT DOCUMENTS

| | | | |
|---|---|---|---|
| 2436608 | 5/1980 | France | 297/482 |
| 2530208 | 1/1984 | France | 297/482 |
| 3019378 | 11/1981 | Germany | 297/482 |
| 3501747 | 9/1986 | Germany | 297/482 |
| 63-74747 | 4/1988 | Japan | 297/482 |
| 2182838 | 5/1987 | United Kingdom | 297/482 |

*Primary Examiner*—Jose V. Chen
*Assistant Examiner*—David E. Allred
*Attorney, Agent, or Firm*—Joseph N. Breaux

[57] ABSTRACT

A non-slip seat belt cover includes an elongated, rectangular section of covering material having an interior surface and an exterior surface; a first elongated strip of hook-and-pile fastener, attached along one of the longer edges of the exterior surface; a second elongated strip of hook-and-pile fastener, attached along the longer edge of the interior surface opposite the edge to which the first fastener strip is attached; and a securing mechanism including a plurality of prong members secured to the interior surface of the interior surface adjacent one of the shorter ends of the rectangular section. The securing member is preferably a cleat pad having a plurality of rows of prong members extending from the cleat pad. The prong members are preferably angled with respect to the cleat pad at an angle between twenty-five and sixty degrees. When angled prong members are utilized, the point of the prongs should be oriented away from the adjacent shorter edge of the rectangular section.

3 Claims, 3 Drawing Sheets

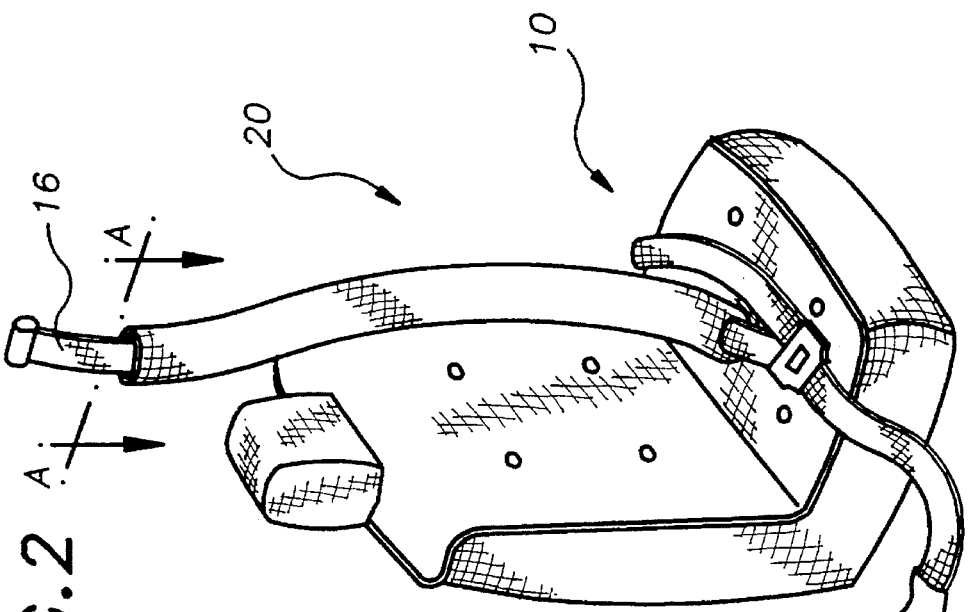
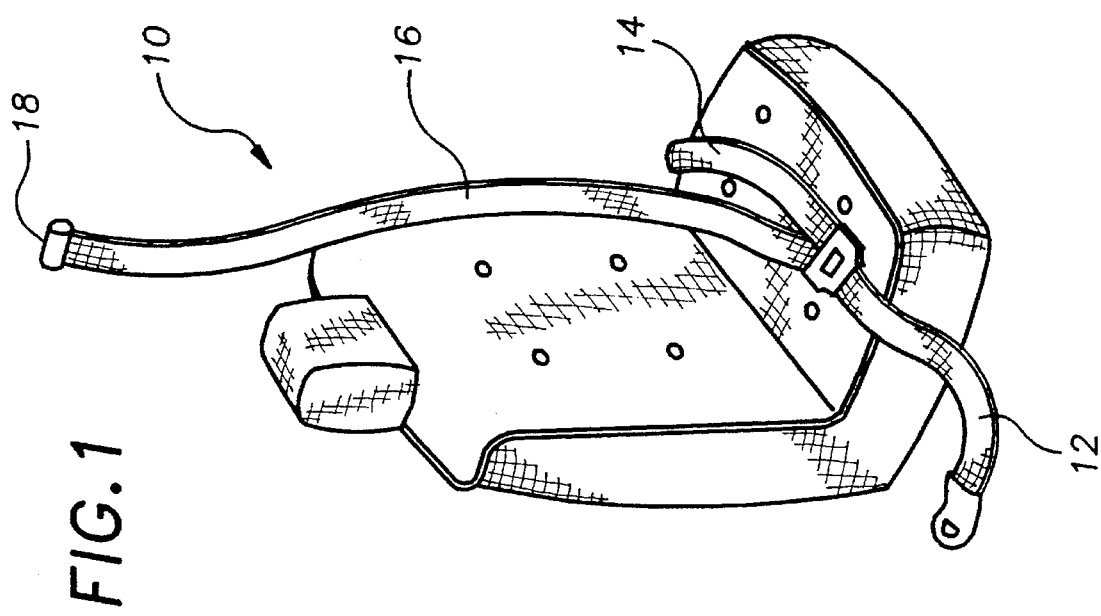

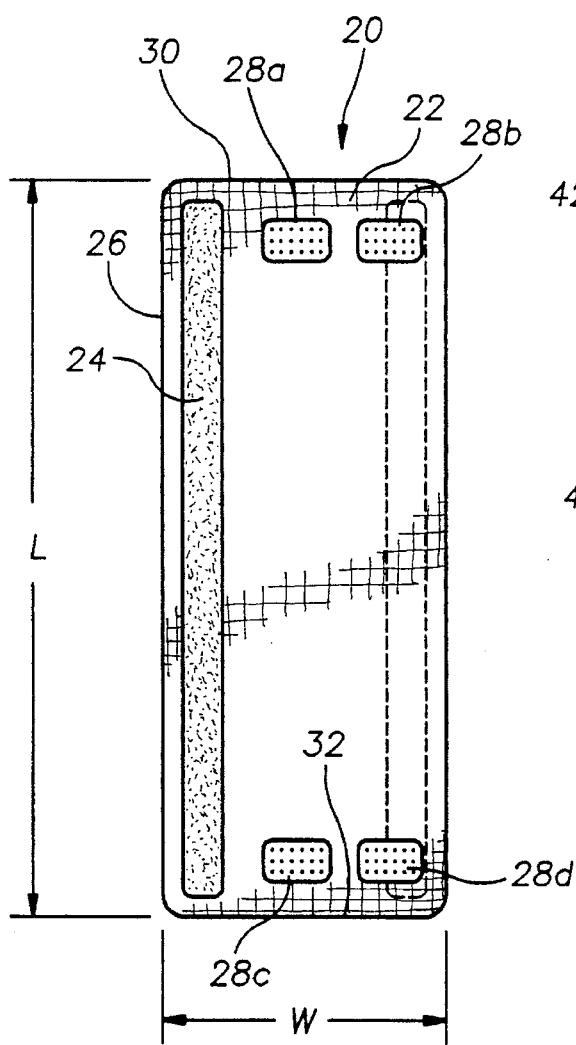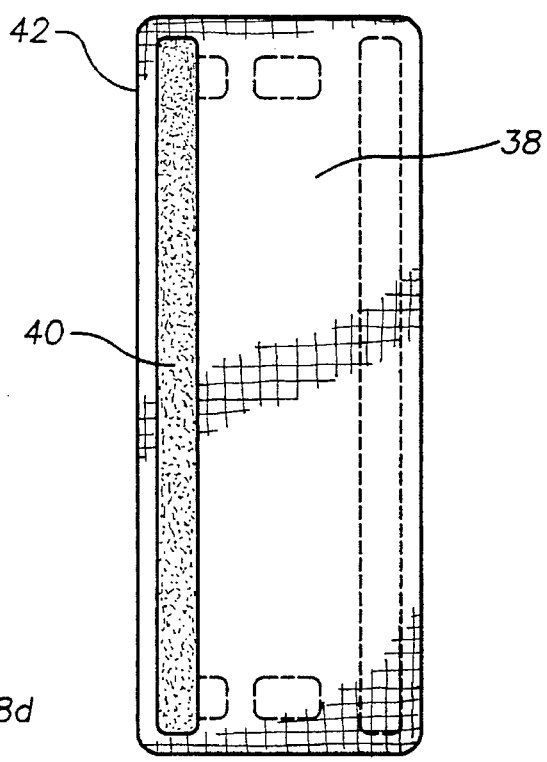

NON-SLIP SEAT BELT COVER

TECHNICAL FIELD

The present invention relates to covers for seat belts and more particularly to covers for seat belts that include a mechanism for preventing the seat belt cover from sliding with respect to the seat belt.

BACKGROUND ART

Seat belt covers can lessen the discomfort of wearing the seat belt, as well as, provide an excellent area upon which an advertiser can display an advertising message. The seat belt cover is generally wrapped around the shoulder belt and secured with fasteners. This securing arrangement secures the seat belt cover to the seat belt but provides no mechanism for preventing the seat belt cover from sliding with respect to the seat belt. When the seat belt cover is allowed to slide with respect to the seat belt, the seat belt cover can become bunched up at the end of the seat belt adjacent the seat belt rewind mechanism. It would be a benefit, therefore, to have a seat belt cover that provided a mechanism for preventing the seat belt cover from sliding with respect to the seat belt.

GENERAL SUMMARY DISCUSSION OF INVENTION

It is thus an object of the invention to provide a non-slip seat belt cover that includes a mechanism for preventing the seat belt cover from sliding with respect to the seat belt.

Accordingly, a non-slip seat belt cover is provided that includes an elongated, rectangular section of covering material having an interior surface and an exterior surface; a first elongated strip of hook-and-pile fastener, attached along one of the longer edges of the exterior surface; a second elongated strip of hook-and-pile fastener, attached along the longer edge of the interior surface opposite the edge to which the first fastener strip is attached; and a securing mechanism including a plurality of prong members secured to the interior surface of the interior surface adjacent one of the shorter ends of the rectangular section. The securing member is preferably a cleat pad having a plurality of rows of prong members extending from the cleat pad. The prong members are preferably angled with respect to the cleat pad at an angle between twenty-five and sixty degrees. When angled prong members are utilized, the point of the prongs should be oriented away from the adjacent shorter edge of the rectangular section.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 1 is a perspective view of a representative seat belt arrangement of the type that the non-slip seat belt cover of the invention may be used.

FIG. 2 is a perspective view of the representative seat belt arrangement with an exemplary embodiment of the non-slip seat belt cover secured to the shoulder belt.

FIG. 3 is a plan view of the interior surface of the rectangular cover member.

FIG. 4 is a plan view of the exterior surface of the rectangular cover member.

EXEMPLARY MOD FOR CARRYING OUT THE INVENTION

Figure 3A:
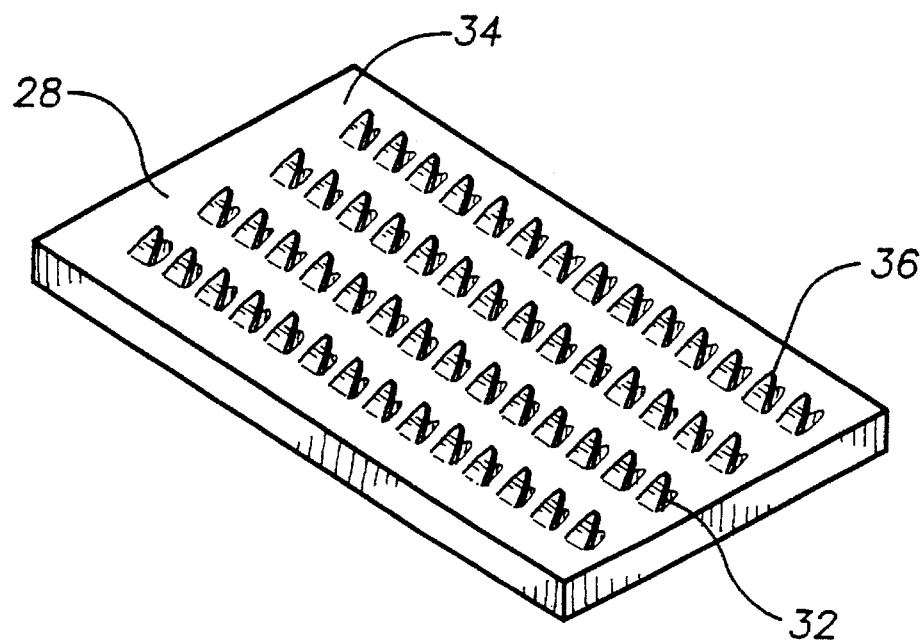
FIG. 3A is a perspective view of one of the cleat pads shown FIG. 3.

FIG. 1 is a perspective view of a representative seat belt arrangement, generally referenced by the numeral 10, of the type that the non-slip seat belt cover of the invention may be used. Seat belt arrangement 10 includes a securing belt 12, a lap belt 14, and a shoulder belt 16. Shoulder belt 16 is secured to a rewind mechanism 18. FIG. 2 shows seat belt arrangement 10 with an exemplary embodiment of the non-slip seat belt cover, generally referenced by the numeral 20, secured to shoulder belt 16. As can be seen in the figure, cover 20 forms an elongated sleeve within which a section of shoulder belt 16 is disposed.

FIG. 3 is a plan view of an interior surface 22 of cover 20. Cover 20 is a substantially rectangular sheet of quilted, canvas fabric having a length "L" of about thirty (30") inches and a width "W" of about four and one-half (4½") inches. A first strip 24 of hook-and-pile fastener of a length about one-half (½") inch shorter than length "L" is attached along a longer edge 26 of exterior surface 22. Two cleat pads 28a–28b are secured to interior surface 22 about one-half (½") inch from a shorter edge 30 of cover 20. Two additional cleat pads 28c–28d are secured to interior surface 22 about one-half (½") inch from a second shorter edge 32 of cover 20.

FIG. 3A is a perspective view of one of cleat pads 28 in isolation. Each cleat pad 28 includes a plurality of pointed prong members 32 that extend from a substantially planar base 34 at an angle of about forty-five (45°) degrees from base 34 and arranged in four parallel rows. Each cleat pad 28 is oriented in a manner such that the points 36 of prong members 32 are oriented away from the edge 30,32 to which the cleat pad 28 is adjacent. In this embodiment, cleat pads 28 are metal and prong members 32 are stamped out of cleat pad 28 in a can opener fashion.

FIG. 4 shows an exterior surface 38 of cover 20. A second strip 40 of hook-and-pile fastener of a length about one-half (½") inch shorter than length "L" is attached along a longer edge 42 of exterior surface 38. In this embodiment, first strip 24, second strip 40 and the four cleat pads 28 are adhesively attached to cover 20. Exterior surface 38 may be screen printed or carry other advertising indicia if desired.

Figure 5:
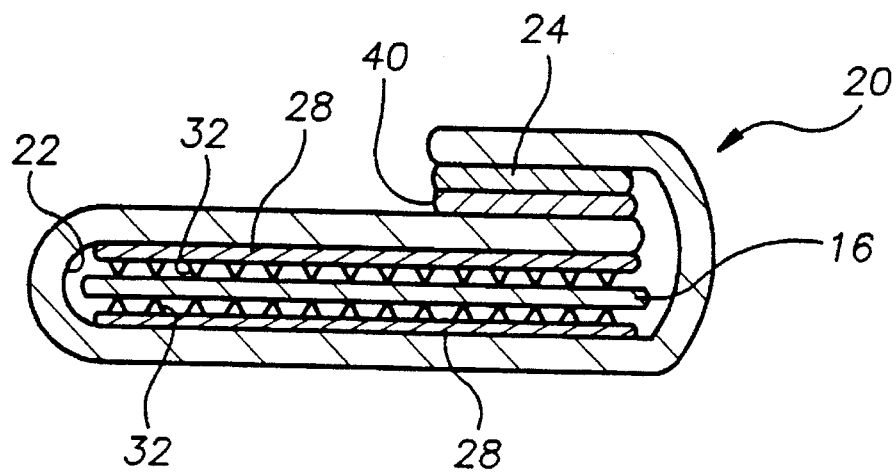
FIG. 5 is a cross sectional view of the non-slip seat belt cover of FIG. 2 along the line A—A.

FIG. 5 is a cross-sectional view of cover 20 secured about shoulder belt 16 along the line A—A of FIG. 2. As shown in the figure, prong members 32 of cleat pads 28 contact and become engaged with shoulder belt 16 when interior surface 22 of cover 20 is wrapped about shoulder belt 16. Cover 20 is secured about shoulder belt 16 by placing first strip 24 against second strip 40.

The use and operation of non-slip seat belt cover 20 is now described with general reference to FIGS. 1–5. Cover 20 is installed over shoulder belt 16 by placing shoulder belt 16 onto interior surface 22 while cover 20 is folded over in a manner such that a first section of shoulder belt 16 is sandwiched between cleat pads 28a,28b, and a second section of shoulder belt 16 is sandwiched between cleat pads 28c,28d. First and second strips 24,40 are then placed into contact to secure cover 20 in place. It can be appreciated from the foregoing description that as any end of cover 20 is urged toward the other end, prong members 32 act against shoulder belt 16 to resist the urging.

can also be seen from the preceding description that a non-slip seat belt cover that includes a mechanism for preventing the seat belt cover from sliding with respect to the seat belt has been provided.

It is noted that the embodiment of the non-slip seat belt cover described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A non-slip seat belt cover comprising:

an elongated, rectangular section of covering material having an interior surface and an exterior surface;

a first fastening mechanism attached, along a first longer edge of said section, to said interior surface;

a second fastening mechanism attached, along a second longer edge of said section, to said exterior surface; and a securing mechanism including first, second, third, and fourth cleat pads, said first and second cleat pads being spaced apart and having substantially planar bases secured to said interior surface adjacent a first shorter edge thereof, said third and fourth cleat pads being spaced apart and having substantially planar bases secured to said interior surface adjacent a second shorter edge thereof, each said first, second, third, and fourth cleat pad including a plurality of pointed prong members that extend from a a respective one of said substantially planar bases away from said interior surface to which said respective one of said bases is secured at an angle of between twenty-five and sixty degree with respect to said one of said substantially planar bases, said first and second cleat pads being oriented in a manner such that points of said prong members extending therefrom are oriented away from said first shorter edge, said third and fourth cleat pads being oriented in a manner such that points of said prong members extending therefrom are oriented away from said second shorter edge.

2. The non-slip seat belt cover of claim 1, wherein:

said first, second, third, and fourth cleat pads are metal; and said prong members are stamped out of said cleat pad.

3. The non-slip seat belt cover of claim 2 wherein:

said prong members are arranged into four parallel rows.

\* \* \* \* \*